(12) United States Patent
Mizuura et al.

(10) Patent No.: US 9,513,607 B2
(45) Date of Patent: Dec. 6, 2016

(54) OPERATING DEVICE AND MOVABLE MACHINE CONTROLLING SYSTEM

(71) Applicant: Daihen Corporation, Osaka (JP)

(72) Inventors: Shigeto Mizuura, Osaka (JP); Tatsuo Kudou, Osaka (JP)

(73) Assignee: Daihen Corporation, Osaka (JP)

( * ) Notice: Subject to any disclaimer, the term of this patent is extended or adjusted under 35 U.S.C. 154(b) by 440 days.

(21) Appl. No.: 13/682,000

(22) Filed: Nov. 20, 2012

(65) Prior Publication Data

US 2013/0138229 A1 May 30, 2013

(30) Foreign Application Priority Data

Nov. 25, 2011 (JP) .................................. 2011-257129

(51) Int. Cl.
| | |
|---|---|
| G05B 15/00 | (2006.01) |
| G06F 19/00 | (2011.01) |
| G05B 19/00 | (2006.01) |
| G05D 11/00 | (2006.01) |
| B66C 11/00 | (2006.01) |
| B66C 1/00 | (2006.01) |
| G05B 11/01 | (2006.01) |
| B25J 13/06 | (2006.01) |
| H01H 9/02 | (2006.01) |

(52) U.S. Cl.
CPC .............. *G05B 11/01* (2013.01); *B25J 13/06* (2013.01); *H01H 9/0235* (2013.01)

(58) Field of Classification Search
CPC ............ G05B 11/01; G09G 5/00; B25J 13/02; B25J 13/06; H01H 9/06
USPC ....... 700/44, 45, 83, 84, 85, 245; 463/37, 38
See application file for complete search history.

(56) References Cited

U.S. PATENT DOCUMENTS

| | | | |
|---|---|---|---|
| 2002/0015035 A1* | 2/2002 | Inaba et al. .................... | 345/204 |
| 2002/0114654 A1 | 8/2002 | Abe | |
| 2003/0018403 A1* | 1/2003 | Braun et al. ..................... | 700/45 |
| 2003/0137338 A1 | 7/2003 | Hisatsune et al. | |
| 2006/0293797 A1* | 12/2006 | Weiler ........................... | 700/284 |
| 2008/0125178 A1 | 5/2008 | Park et al. | |
| 2009/0289904 A1* | 11/2009 | Park et al. ..................... | 345/173 |
| 2011/0010006 A1* | 1/2011 | Tani et al. ..................... | 700/245 |

(Continued)

FOREIGN PATENT DOCUMENTS

| | | |
|---|---|---|
| JP | 2001-88069 A | 4/2001 |
| JP | 2002-91665 A | 3/2002 |

OTHER PUBLICATIONS

"European Application Serial No. 12193582.9, European Search Report mailed May 31, 2013", 5 pgs.

*Primary Examiner* — Mohammad Ali
*Assistant Examiner* — Md Azad
(74) *Attorney, Agent, or Firm* — Schwegman Lundberg & Woessner, P.A.

(57) ABSTRACT

An operating device is provided with an operating section, in which a plurality of operating keys for operating a control target is laid out, and a display section, in which a screen corresponding to an input of the operating keys is to be displayed. The operating section does not have names of the operating keys printed thereon. The operating device or a controller has a storage means that stores guide information that guides the names of the operating keys. The names and an image of the operating keys corresponding to a selected language are displayed on the display section in accordance with a predetermined operation.

8 Claims, 7 Drawing Sheets

(56) References Cited

U.S. PATENT DOCUMENTS

2011/0285656 A1   11/2011  Yaksick
2012/0044177 A1*  2/2012  Ohta et al. .................... 345/173

* cited by examiner

TP (Enlarged Diagram of Section)

| Identification Code | Layout Coordinate | Name of Keys | | |
|---|---|---|---|---|
| | | Japanese | English | ... |
| 1 | (100,200) | 記憶 | RECORD | ... |
| 2 | (140,200) | 削除 | DELETE | ... |
| 3 | (140,250) | 修正 | MODIFY | ... |
| ⋮ | ⋮ | ⋮ | ⋮ | ⋮ |

Fig.7

| Identification Code | Name of Keys | Layout Coordinate | Selected Frame Size |
|---|---|---|---|
| 1 | Record | (100,200) | 40 x 40 |
| 2 | Delete | (140,200) | 40 x 40 |
| 3 | Enter | (140,250) | 40 x 60 |
| : | : | : | |

OPERATING DEVICE AND MOVABLE MACHINE CONTROLLING SYSTEM

RELATED APPLICATIONS

This application claims the benefit of priority under 35 U.S.C. Section 119, to Japanese Patent Application Serial No. 2011-257129, filed on Nov. 25, 2011, which application is incorporated herein by reference in its entirety.

BACKGROUND OF THE INVENTION

The present invention relates to an operating device and a movable machine controlling system provided with the operating device, which are used for operating household electric appliances and the like or for teaching movable machines such as industrial robots.

For example, operating devices disclosed in Japanese Laid-Open Patent Publication No. 2001-88069, Japanese Laid-Open Patent Publication No. 2002-91665 and the like are each provided with an operating section including a plurality of keys and buttons, for operating a control target, and a display section for displaying an operation result by the operating section, a message and the like. Such an operating device may be integrated to a main body, such as with an air cleaner, or may be a remote controller that is independent from the main body, such as with an air conditioner. In the field of processing such as machine tools and industrial robots, the above-described operating devices are also used. This type of operating devices are referred to as teach pendants, and in most cases they assume a portable configuration by which they can be carried by a worker.

In an operating device, names of effects and functions to be performed by the control target are printed on surfaces of the keys and buttons, or in the vicinities thereof. In the case of household electric appliances, direct printing is often performed on the keys and buttons, which are made of plastic. In the case of machine tools, a key sheet is adhered to cover the entire surfaces of the keys and buttons, and icons indicating the effects and functions are depicted on a surface of the key sheet corresponding to the keys and buttons. The ornamental portions of the key sheet are processed with embossing. Further, the names of the keys and buttons are printed on surfaces of the embossed sections or in blank areas in the vicinities thereof. The operating device receives an operation by the embossed section being depressed, by which a key or a button directly below the key sheet is depressed.

For example, a key or button for receiving a data storage operation has Japanese characters meaning "store" printed thereon, and a key or button for receiving a deletion operation has Japanese characters for "delete" printed thereon. In this case, if the operator is Japanese, no problem will rise in using the operating device. However, a non-Japanese cannot understand meanings of the names of the keys and buttons. Thus, in a case of shipping to foreign countries, the indicia for the names of the keys and buttons must be changed in accordance with the language to be used at the shipment destination. In the case of employing the key sheet, the key sheet on which the names of the keys and buttons are printed needs to be replaced in accordance with the language to be used.

Accordingly, a plurality of types of operating device main bodies or key sheets corresponding to respective languages need to be prepared in stock in order to correspond the contents of printing to the respective languages. Further, burden of packaging and adhering increases proportionate to the number of countries to ship to. Thus, management costs and numbers of manufacturing steps are increased.

SUMMARY OF THE INVENTION

Accordingly, it is an objective of the present invention to provide an operating device, and a movable machine controlling system provided with the operating device with which names of respective things to be manipulated can easily be identified while reducing management costs and the number of manufacturing steps.

To achieve the foregoing objective and in accordance with a first aspect of the present invention, an operating device that operates a control target is provided. The operating device includes an operating section, a display section, a storage means, and a guide information controlling means. The operating section has a plurality of laid out manipulanda to be operated upon operating the control target. The operating section does not have names of the manipulanda printed thereon. A screen corresponding to an input of the manipulandum is to be displayed on the display section. The storage means stores guide information for guiding the respective names of the plurality of manipulanda. The guide information controlling means outputs the guide information to the display section in accordance with a predetermined operation.

In accordance with a second aspect of the present invention, a movable machine controlling system is provided that includes the operating device according to the first aspect, a movable machine as the control target, and a controller for controlling the movable machine. The operating device, the movable machine, and the controller are connected in a communicable manner.

In accordance with a third aspect of the present invention, a movable machine controlling system is provided that includes a controller for controlling a movable machine and an operating device connected with the controller in a communicable manner. The operating device includes an operating section and a display section. The operating section has a plurality of laid out manipulanda to be operated upon operating the movable machine. The operating section does not have names of the manipulanda printed thereon. A screen corresponding to an input of the manipulandum is to be displayed on the display section. At least one of the controller and the operating device includes a storage means, an output means, a first region selecting means, a second region selecting means, and a guide information controlling means. The storage means stores operating section image data, in which the operating section is imaged, and an operation key table, in which names and identification codes corresponding to respective ones of the plurality of manipulanda and layout information of the manipulanda on the operating section image data are associated. The output means outputs the names to a first region in the display section and outputs the operating section image data to a second region in the display section in accordance with a predetermined operation. The first region selecting means selects one of the names displayed in the first region. The second region selecting means selects one of the plurality of manipulanda displayed in the second region. The guide information controlling means links selection results in the first region and the second region based on the identification codes and the layout information.

BRIEF DESCRIPTION OF THE DRAWINGS

FIG. 7 is an explanatory diagram showing an operation key table in which key name layout information and the like are associated.

DETAILED DESCRIPTION OF THE PREFERRED EMBODIMENTS

First Embodiment

Below, an operating device according to a first embodiment of the present invention will be described with reference to FIGS. 1 to 4(b).

Figure 1:
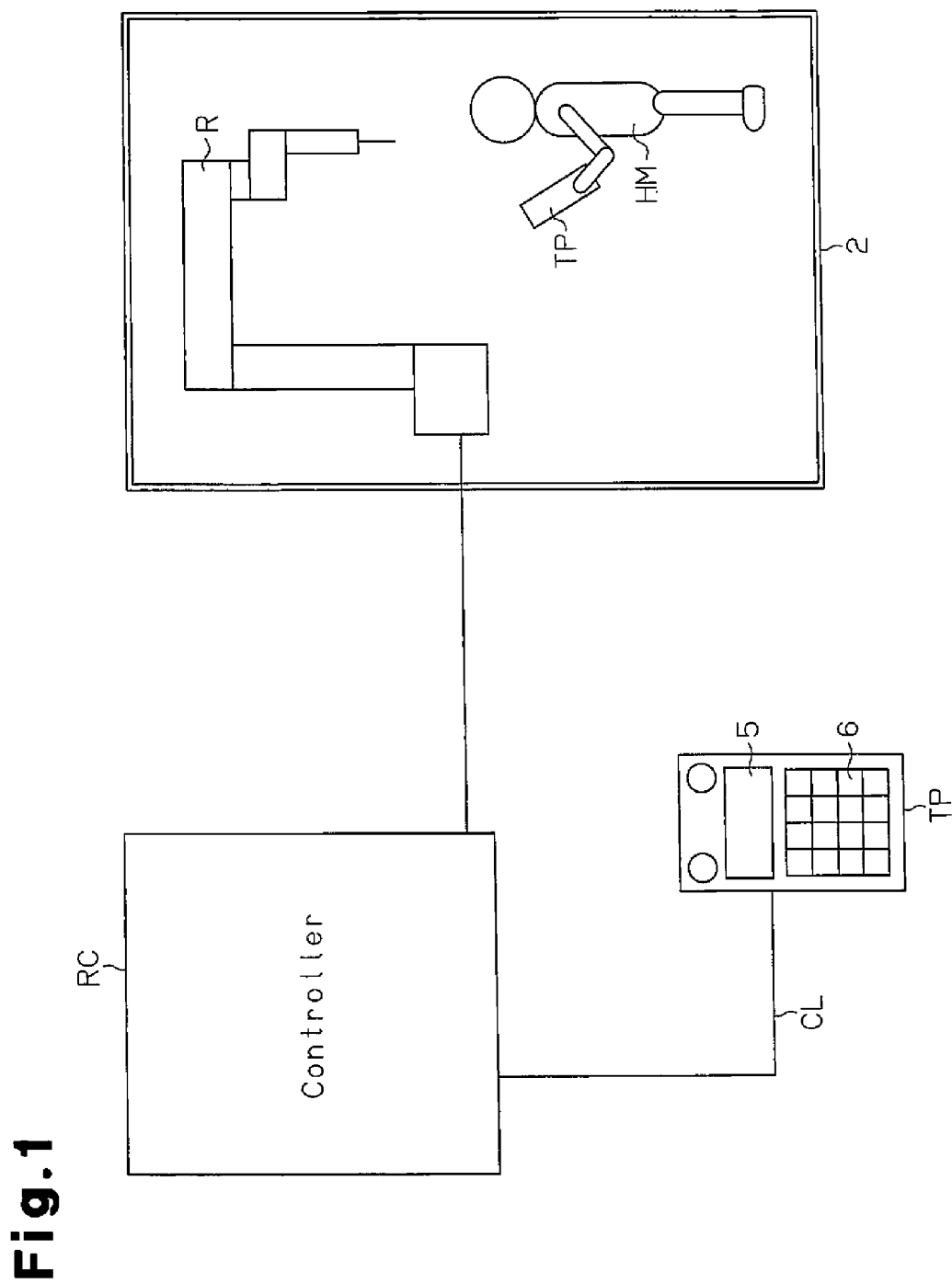
FIG. 1 is a block diagram showing a controlling system for an industrial robot provided with an operating device according to a first embodiment of the present invention.

As shown in FIG. 1, a robot controlling system 1 includes a robot R, a teach pendant TP as an operating device, and a controller RC that controls movements of the robot R. The robot R performs work such as arc welding, spot welding, and the like. A worker HM performs teaching by using the teach pendant TP. The robot R has a work tool such as an arc welding torch, a spot welding gun and the like at the tip of its wrist section. The robot R is installed inside a safety fence 2.

The teach pendant TP includes a display 5 that displays various types of data and operation results, and an operating section 6 that is to be operated upon operating the robot R. The operating section 6 is provided with jog keys to be operated when the robot R is manually operated, a storage key to be operated when teaching data for the robot R is stored, and a deletion key to be operated when the teaching data is deleted. When these operating keys are pressed, operating signals are sent to the controller RC via a communication line CL. The controller RC performs jog feed operation, teaching data storing and the like based on the operating signals.

The controller RC performs control of the robot R and a storing process of the teaching data based on the operating signals from the teach pendant TP. Further, when a start signal is input from outside, the controller RC runs the teaching data. As a result, the robot R is driven automatically.

Figure 2:
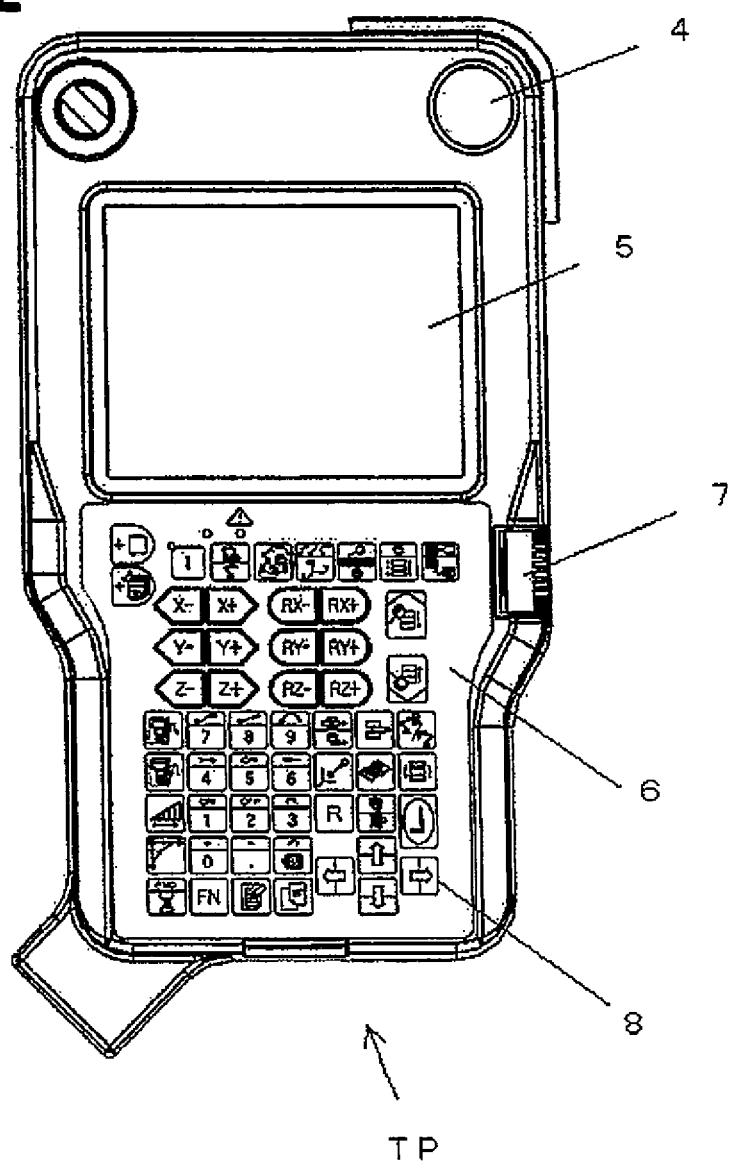
FIG. 2 is a plan view of a teach pendant.

As shown in FIG. 2, the teach pendant TP is further provided with an emergency stop switch 4 that is to be operated upon an emergency stop of the robot R, and a jog dial 7 to be operated upon a menu selection.

The operating section 6 is configured of a key sheet. A plurality of operating keys 8 is laid out on the key sheet. Further, effects and functions endowed to the respective operating keys 8 are indicated by icons so that they can be identified by signs, alphabets and the like. That is, key names that differ depending on languages used in respective countries are not printed. For example, the storage key is not indicated by Japanese characters for "storage", but is indicated by an icon by which a concept of "storage" can be understood. The display 5 displays guide information for showing the key names and confirming the same.

Figure 3:
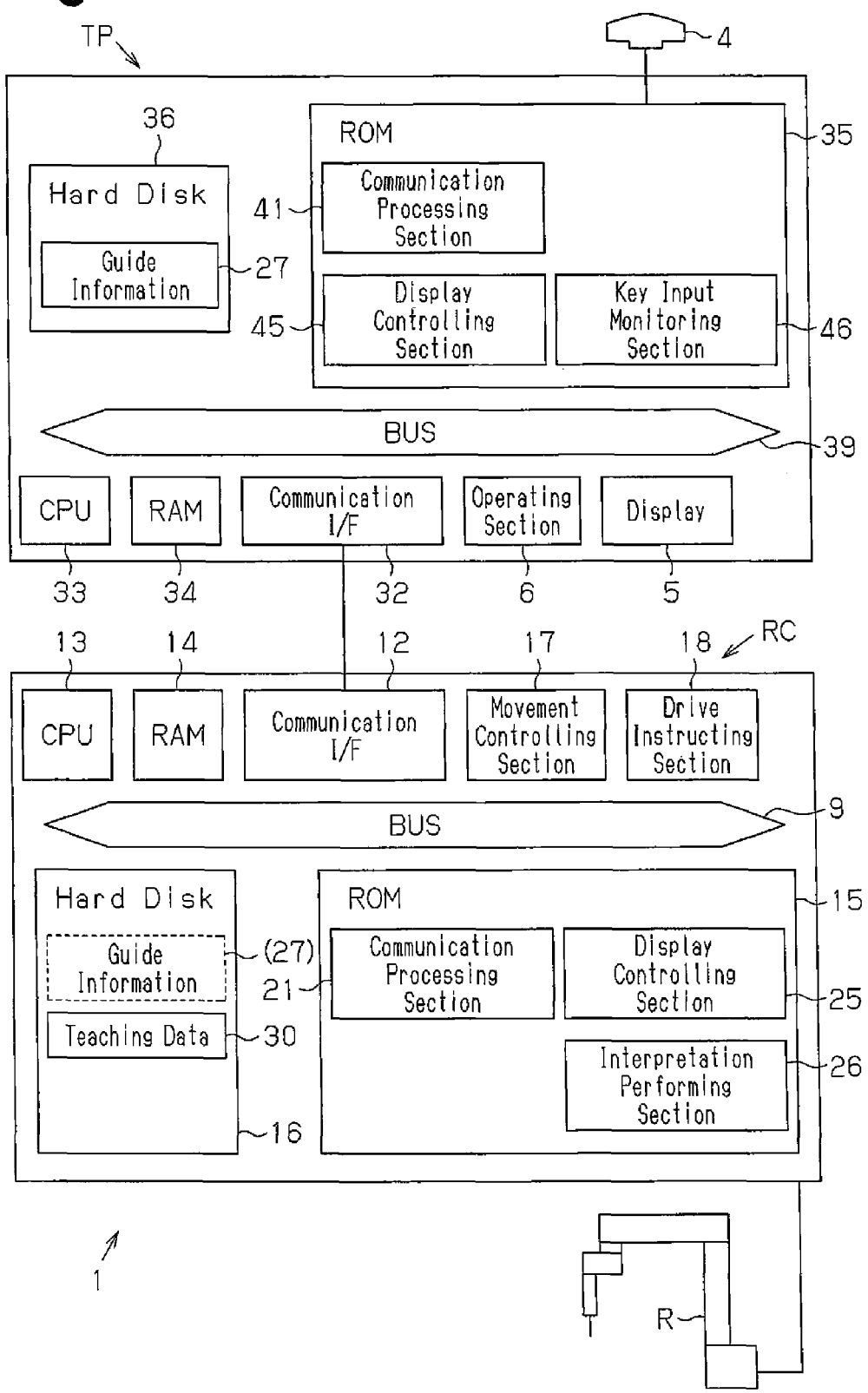
FIG. 3 is a block diagram showing a configuration of the robot controlling system.

As shown in FIG. 3, the teach pendant TP includes the emergency stop switch 4, the display 5, the operating section 6, a CPU 33, a RAM 34, a communication interface 32, a ROM 35, and a hard disk 36. The emergency stop switch 4, the display 5, the operating section 6, the CPU 33, the RAM 34, the communication interface 32, the ROM 35, and the hard disk 36 are connected to one another via a bus 39.

The CPU 33 is a central processing unit, and performs software programs stored in the ROM 35 on an operating system that is not shown. The CPU 33 corresponds to a guide information controlling means. The RAM 34 is a temporal calculating region. The communication interface 32 performs a communication with the controller RC. The ROM 35 stores the software programs to be executed by the CPU 33 and control parameters.

The hard disk 36 as a storage means stores guide information 27. The guide information 27 is data for guiding the names of the respective operating keys 8. This data refers to a still image in which the names of the respective operating keys 8 are added in an identifiable manner to operating section image data in which the operating section 6 is imaged. The names of the operating keys 8 are not printed on the operating section image data. This data will be referred to as guide display data herein. The guide display data is provided to support, for example, a plurality of languages such as English, Chinese, and the like. One guide display data can be displayed simultaneously on the display 5, and the guide display data corresponding to one predetermined language (first language) is invoked.

The ROM 35 includes a display controlling section 45, a key input monitoring section 46, and a communication processing section 41 as control software for integrally controlling the CPU 33, the RAM 34, and the like. The display controlling section 45 displays data for display on the display 5. The key input monitoring section 46 monitors key inputs from the operating section 6. The communication processing section 41 performs processes for controlling the communication with the controller RC.

The controller RC includes a CPU 13, a RAM 14, a ROM 16, a hard disk 19, a movement controlling section 17, a drive instructing section 18 and a communication interface 12 for communicating with the teach pendant TP. The CPU 13, the RAM 14, the ROM 16, the hard disk 19, the movement controlling section 17, the drive instructing section 18 and the communication interface 12 are connected to one another via a bus 9.

The CPU 13 is a central processing unit, and performs software programs stored in the ROM 15 on an operating system that is not shown. The RAM 14 is a temporal calculating region. The communication interface 12 performs the communication with the teach pendant TP. The ROM 15 stores the software programs to be executed by the CPU 13 and control parameters. The hard disk 16 stores teaching data 30 created by the operation of the teach pendant TP. Further, the hard disk 16 may store the guide information 27. The CPU 13 corresponds to a guide information controlling means, and the hard disk 16 corresponds to a storage means.

The ROM 15 includes a communication processing section 21, a display processing section 25, and an interpretation performing section 26 as control software for integrally controlling the CPU 13, the RAM 14, and the like. The communication processing section 21 performs a communication process with the teach pendant TP. The display processing section 25 creates the data for display to be displayed on the display 5. The interpretation performing section 26 interprets the teaching data 30 stored in the hard disk 16, and outputs movement controlling signals to the movement controlling section 17. The movement controlling section 17 performs a trajectory calculation and the like of the robot R based on the movement controlling signals. Then, the movement controlling section 17 outputs the calculation result to the drive instructing section 18 as driving signals. The drive instructing section 18 outputs servo controlling signals for controlling respective servo motors of the robot R. As a result, movement of the robot R is controlled.

Next, operation of the teach pendant TP will be described.

The guide display data is invoked by a predetermined key operation or a menu operation on the teach pendant TP. In this event, the CPU 33 reads one guide display data from the hard disk 36, and outputs the same to the display 5.

Figure 4A:
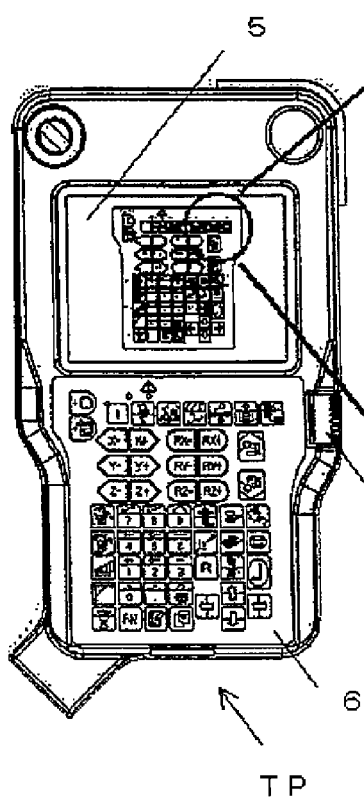
FIG. 4(a) is a plan view showing the teach pendant in which guide display data is displayed on a display.
Figure 4B:
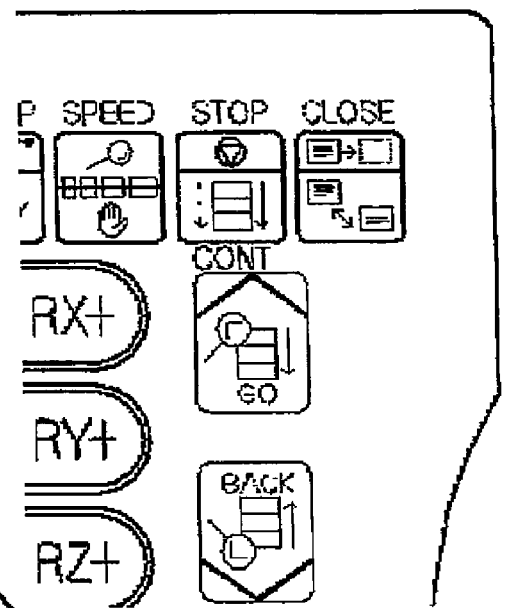
FIG. 4(b) is a partial plan view showing a part of the guide display data in an enlarged manner.

As shown in FIGS. 4(a) and 4(b), when the invoking operation of the guide display data is performed, the guide display data is displayed on the display 5. In this case, even if the names of the operating keys 8 are not printed on the operating section 6, the names of the operating keys 8 are displayed in an identifiable manner on the display 5. The guide display data can be zoomed in or zoomed out by an operation of the jog dial 7.

Thus, according to the first embodiment, advantages as follows are achieved.

(1) The operating section 6 is configured of the key sheet. The design of the operating keys laid out on the key sheet is expressed by signs, alphabets, and the like without printing the names of the operating keys, so as not to be influenced by the used languages. By employing such a key sheet, the management cost and the numbers of manufacturing steps can be reduced compared to a conventional configuration. Further, the guide display data is displayed on the display 5 of the teach pendant TP. This enables the worker to easily identify the names of the operating keys 8. Further, by providing the guide display data to correspond respectively to a plurality of languages, a flexible compatibility to the language used by the worker can also be achieved.

Second Embodiment

Below, a second embodiment of the present invention will be described with reference to FIGS. 5(a) and 5(b). As to portions in the second embodiment that are similar to those in the first embodiment, detailed descriptions thereof will be omitted.

In the first embodiment, a plurality of guide display data that differ for each of the languages such as for Japanese, for English and the like were stored in the hard disk 36 as the guide display data to be displayed on the display 5. However, in this case, a storage volume of the hard disk 36 increases. The second embodiment differs from the first embodiment in that operating section image data before adding names of operating keys 8 and language information are stored separately, and the guide display data is created by composing the operating section image data and the language information in accordance with an operation request in a guide display.

Figures 5A, 5B:
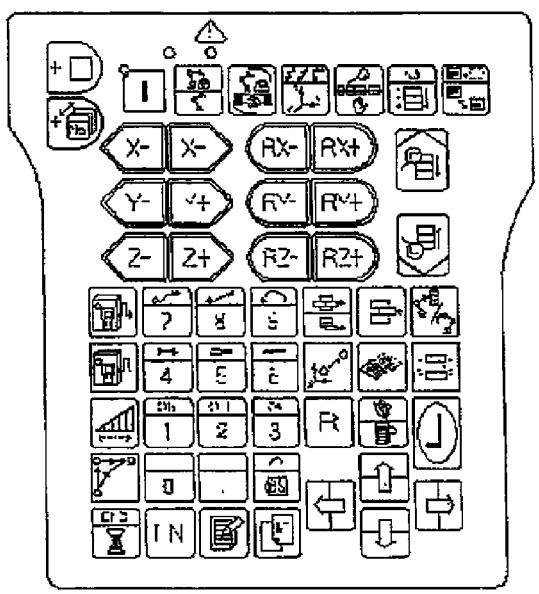
FIG. 5(a) is an explanatory diagram showing operating section image data in which an operating section is imaged.
FIG. 5(b) is an explanatory diagram showing name layout information.

FIG. 5(a) shows the operating section image data that displays an operating section 6 as a still image without the names of the operating keys 8 being added. FIG. 5(b) shows a key name table for managing identification codes (numbers), key names, layout coordinates of the key names and the like of the respective operating keys 8. The layout coordinates are data indicating positions where the key names are to be positioned in the operating section image data. For example, in a case of a key with the identification code of "1", a coordinate position of (100, 200) is processed as the position where a depiction of the key name is started. The operating section image data and the key name table are stored in a hard disk 36 as guide information 27. Further, the operating section image data and the key name table may be stored in a hard disk 16 of a controller RC.

Next, operation of the teach pendant TP will be described.

The guide display data is invoked by a predetermined key operation or a menu operation on the teach pendant TP. In this event, a CPU 33 reads the operating section image data from the hard disk 36. Further, the CPU 33 refers to the key name table, and reads out all of the key names and the layout coordinate values corresponding to a language that is set in advance as a first language. Then, the CPU 33 performs a depiction process to depict the key names on the operating section image data, and outputs guide display data obtained by the depiction process to a display 5. As a result, an image identical to FIG. 4 is displayed on the display 5. In this case, the display 5 may display the identification codes together with the image of FIG. 4.

Thus, according to the second embodiment, advantages as follows are achieved.

(2) The hard disk 36 stores in advance the operating section image data, in which the operating section 6 is imaged, and the key name table. The CPU 33 creates the guide display data by layering the key names on the operating section image data in accordance with the predetermined operation, and displays the same on the display 5. By so doing, a storage volume of the hard disk 36 can be made small compared to the first embodiment provided with the plurality of guide display data that differs for each language.

Further, by displaying the identification codes together with the key names on the operating section image data, identification is further facilitated. Typically, the proficiency for operating the teach pendant TP varies among individual workers. At an actual working site, a worker with high proficiency (expert) may instruct an operating method to a worker who is not accustomed to the operation (non-expert). If the expert is not present around the non-expert, the expert may communicate the operating method to the non-expert from a remote site by telephone and the like. In this case, there is a risk of a misunderstanding occurring between the operating keys instructed by the expert and the operating keys understood by the non-expert. Specifically, even if the expert communicated an instruction to press a storage key, the non-expert may press the wrong key due to not knowing a position of the storage key. This occurs due to the communication being performed by way of language information, that is, the key name. To this respect, according to the present invention, the identification code such as a numerical value can be displayed on the display 5 in addition to the key name. In this case, the operating method can easily be communicated from the expert to the non-expert for example by using an expression of "No. 1 key".

Third Embodiment

Below, a third embodiment of the present invention will be described with reference to FIGS. 6 and 7. As to portions in the third embodiment that are similar to those in the second embodiment, detailed descriptions thereof will be omitted.

In the first and second embodiments, the guide display data in which the key names are added to the operating section image data which is the image of the operating section 6 was displayed for each of the languages. The third embodiment differs from the first and second embodiments in that a display 5 is a touch-panel type display, which displays a first region corresponding to key names and a second region corresponding to operating section image data separately and links both of the display regions.

Figure 6:
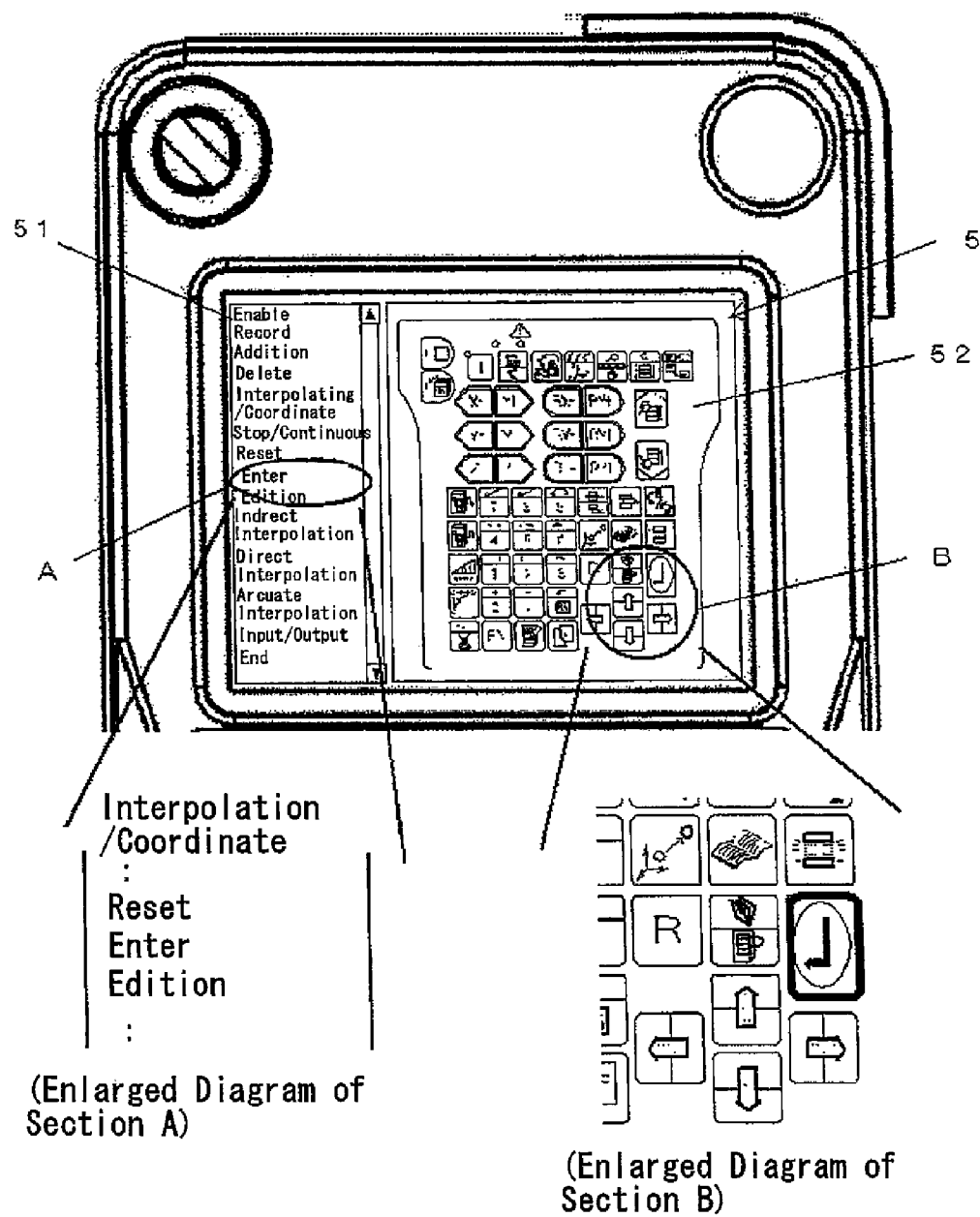
FIG. 6 is an explanatory diagram displaying a region corresponding to key names and a region corresponding to the operating section image data separately.

As shown in FIG. 6, the display 5 displays the first region 51 and the second region 52 in a divided manner. The first region 51 displays the key names in a layout display. The second region 52 displays the operating section image data in which an operating section 6 is imaged. The key names are not added to the operating section image data. The first region 51 and the second region 52 are configured to be capable of selecting one of the keys by a touch operation, and to link selection results of one another.

Specifically, as shown in an enlarged diagram of section A, when an "enter" key is selected in the first region 51, an icon of the relevant enter key is selected in the second region 52 as shown in an enlarged diagram of section B. In this case, as shown in the enlarged diagram of section B, the enter key is displayed by being outlined by a bold frame or a colored frame. Contrary to this, when a desired key is selected in the second region 52, the relevant key is selected in the first region 51. In this case, as shown in the enlarged diagram of section A, the relevant key is displayed with colors of the key and the background being inversed.

As shown in FIG. 7, in an operation key table, coordinate values and selected frame sizes are respectively defined as layout information in addition to identification codes and key names. In the operation key table, as the selected frame sizes, sizes of frames with which operating keys corresponding to the key names selected in the first region 51 can be identified are defined. For example, in the case of the "enter" key of FIG. 6, a size of 40×60 pixels is defined as the selected frame size, and a coordinate position of (140, 250) in the operating section image data is defined as the layout coordinate value.

The operating section image data and the operation key table are stored in advance in a hard disk 16 of a controller RC as guide information 27. When a predetermined operation is performed, a CPU 13 as an output means reads out the operating section image data and the operation key table. Then, the CPU 13 outputs the operating section image data and the operation key table to a teach pendant TP via communication I/Fs 12, 32. In this event, the key names are displayed in the first region 51 in the layout display, and the operating section image data is displayed in the second region 52 of the display 5. Further, a CPU 33 of the teach pendant TP identifies which key was selected in which of the regions based on positional information obtained from a touch panel, and notifies the controller RC. The CPU 13 links the selection result in the first region 51 or the second region 52 based on the identification codes and the layout information in the operation key table.

Thus, according to the third embodiment, advantages as follows are achieved.

(3) The operating section image data, in which the operating section 6 is imaged, the key names, the identification codes, and the layout information of the operating keys are stored in advance in the hard disk 16 of the controller RC. When the predetermined operation is performed, the first region corresponding to the key names and the second region corresponding to the operating section image data are displayed on the display 5 in the divided manner, and are displayed simultaneously. Further, the CPU 13 links the selection result in the first region 51 or the second region 52. According to this configuration also, due to not being affected by used languages, management cost and numbers of manufacturing steps can be reduced. Further, a worker can easily identify the names of the respective manipulanda.

The above embodiments can respectively be modified as follows.

Although the guide display data corresponding to the predetermined one language (first language) is invoked in the first embodiment, the guide display data may be configured to be capable of being switched by operating a language switch menu.

Respectively in the above embodiments, the operating device of the present invention may be adapted to an operating device of an air conditioner, an air cleaner, a water heater, a toilet seat equipped with bidet functions, and the like.

In the first and second embodiments, the guide display data may be processed to be semitransparent so that it may be displayed overlapping with a screen that is currently displayed on the display 5. In this case, since the key names can be confirmed while looking at the screen that is currently being operated, operability of the operating device is improved.

The invention claimed is:

1. An operating device configured to operate a control target, the operating device comprising:
   a key sheet having a plurality of laid out manipulanda to be operated upon to operate the control target, the key sheet without having names of the manipulanda printed thereon;
   a display section on which a screen corresponding to an input of the manipulandum is to be displayed;
   a storage device that stores guide information for guiding the respective names of the plurality of manipulanda; and
   a guide information controlling device that outputs the guide information to the display section in accordance with a predetermined operation, wherein the guide information is configured of guide display data in which the names of the respective manipulanda are added in an identifiable manner to operating section image data, in which the key sheet is imaged;
   wherein the guide information controlling device outputs the guide display data to the display section in accordance with the predetermined operation, the storage device stores a plurality of guide display data, and the plurality of guide display data respectively corresponds to a plurality of languages;
   wherein the operating device is connectable to a controller including:
      an interpretation performing section interprets a teaching data and outputs movement controlling signals to a movement controlling section, the movement controlling section performs a trajectory calculation for a robot based on the movement controlling signals.

2. The operating device according to claim 1, wherein the guide information controlling device creates the guide display data by using name data in a predetermined first language.

3. The operating device according to claim 2, further comprising a language switching device for switching the guide display data in the first language displayed on the display section to guide display data of another language.

4. The operating device according to claim 1, wherein the operating section image data includes identification codes for identifying the respective manipulanda.

5. The operating device according to claim 1, wherein the guide information controlling device processes the guide display data to be semitransparent, and displays the guide display data to be overlapped with a screen that is displayed on the display section.

6. An operating device that operates a control target, the operating device comprising:
   a key sheet having a plurality of laid out manipulanda to be operated upon operating the control target, the key sheet not having names of the manipulanda printed thereon;
   a display section, on which a screen corresponding to an input of the manipulandum is to be displayed;
   a storage device that stores guide information for guiding the respective names of the plurality of manipulanda; and
   a guide information controlling device that outputs the guide information to the display section in accordance with a predetermined operation;
   wherein the storage device stores operating section image data, in which the key sheet is imaged, and a key name table capable of supporting a plurality of languages,
   wherein in the key name table, a plurality of name data of the manipulanda respectively corresponding to the plurality of languages and name layout information indicating layout positions of the plurality of name data on the operating section image data are associated, and
   the guide information controlling device creates guide display data by layering the name data on the operating section image data, in which the key sheet is imaged, based on the name layout information in accordance with the predetermined operation, and outputs the guide display data to the display section;
   wherein the operating device is connectable to a controller including:
      an interpretation performing section interprets a teaching data and outputs movement controlling signals to a movement controlling section, the movement controlling section performs a trajectory calculation for a robot based on the movement controlling signals.

7. The movable machine controlling system according to claim 6,
   wherein the operating device, a movable machine as a control target, and the controller are connected in a communicable manner.

8. The movable machine controlling system according to claim 7, wherein the controller includes the storage device and the guide information controlling device.

\* \* \* \* \*